United States Patent
Ruegg, Jr.

(10) Patent No.: US 9,492,982 B2
(45) Date of Patent: Nov. 15, 2016

(54) PUNCTURE SEALANT LAMINATE

(71) Applicant: Michael Charles Ruegg, Jr., Akron, OH (US)

(72) Inventor: Michael Charles Ruegg, Jr., Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 187 days.

(21) Appl. No.: 14/159,867

(22) Filed: Jan. 21, 2014

(65) Prior Publication Data

US 2014/0130960 A1    May 15, 2014

Related U.S. Application Data

(62) Division of application No. 12/943,963, filed on Nov. 11, 2010, now Pat. No. 8,646,501.

(51) Int. Cl.
  *B60C 19/12* (2006.01)
  *B29D 30/30* (2006.01)
  *B29D 30/06* (2006.01)
  *B29C 73/20* (2006.01)
  *B29C 73/22* (2006.01)

(52) U.S. Cl.
  CPC ........... *B29D 30/30* (2013.01); *B29D 30/0685* (2013.01); *B60C 19/122* (2013.04); *B29C 73/20* (2013.01); *B29C 73/22* (2013.01); *B29D 2030/0682* (2013.01); *Y10T 152/10666* (2015.01); *Y10T 152/10675* (2015.01); *Y10T 152/10693* (2015.01)

(58) Field of Classification Search
  CPC ........... B60C 5/00; B60C 5/14; B60C 5/142; B60C 19/12; B60C 19/122; B60C 19/125; B60C 19/127
  See application file for complete search history.

(56) References Cited

U.S. PATENT DOCUMENTS

| | | | |
|---|---|---|---|
| 1,959,460 A | 5/1934 | Crossan | 156/115 |
| 2,877,819 A | 3/1959 | Gibbs | 152/505 |
| 3,048,509 A | 8/1962 | Sweet et al. | 428/189 |
| 3,903,947 A | 9/1975 | Emerson | 152/504 |
| 4,171,237 A | 10/1979 | Bohm et al. | 156/115 |
| 4,206,796 A | 6/1980 | Chemizard | 152/505 |
| 4,239,076 A | 12/1980 | Chautard et al. | 152/505 |
| 4,388,261 A | 6/1983 | Codispoti et al. | 152/505 |
| 4,398,583 A | 8/1983 | Casey | |
| 4,539,344 A * | 9/1985 | Van Ornum | B29C 73/163 152/502 |
| 4,664,168 A | 5/1987 | Hong et al. | |
| 4,919,183 A | 4/1990 | Dobson | |
| 5,173,811 A | 12/1992 | Gumbs | 359/885 |

(Continued)

FOREIGN PATENT DOCUMENTS

| | | |
|---|---|---|
| EP | 1688239 | 8/2006 |
| EP | 2082902 | 7/2009 |

(Continued)

OTHER PUBLICATIONS

Machine translation of JP 55148604, 1980.*

Primary Examiner — Justin Fischer

(74) Attorney, Agent, or Firm — Alvin T. Rockhill

(57) ABSTRACT

A puncture sealant laminate for prevention of a flat tire may include three layers of sealant material separated by two layers of non-sealant material. The two layers of non-sealant material may prevent the three layers of sealant material from contacting each other and they may have first and second ends that attach to rubber in the tire that is not part of the puncture sealant laminate.

18 Claims, 2 Drawing Sheets

(56) References Cited

U.S. PATENT DOCUMENTS

| | | | |
|---|---|---|---|
| 6,837,287 B2 * | 1/2005 | Smith, Sr. | B29C 73/163 152/503 |
| 6,915,826 B2 | 7/2005 | Poling et al. | |
| 6,962,181 B2 | 11/2005 | Deevers et al. | 152/503 |
| 7,040,364 B2 | 5/2006 | Nakakita et al. | |
| 7,316,253 B2 | 1/2008 | Yamagiwa et al. | |
| 7,607,466 B2 | 10/2009 | Kim et al. | |
| 2003/0230376 A1 | 12/2003 | Smith, Sr. et al. | |
| 2004/0149366 A1 | 8/2004 | Makino et al. | |
| 2008/0142140 A1 | 6/2008 | Marks et al. | |
| 2009/0041999 A1 | 2/2009 | Schroer | |
| 2009/0126842 A1 | 5/2009 | Incavo et al. | |
| 2009/0159182 A1 | 6/2009 | Lammlein, Jr. | |
| 2009/0266463 A1 | 10/2009 | Sekiguchi et al. | |
| 2009/0283192 A1 | 11/2009 | Sekiguchi et al. | |
| 2010/0071821 A1 | 3/2010 | Sekiguchi et al. | |

FOREIGN PATENT DOCUMENTS

| | | |
|---|---|---|
| GB | 2026959 | 2/1980 |
| GB | 2123843 | 2/1984 |
| JP | 55-148604 | * 11/1980 |
| WO | WO 2006/111288 | 10/2006 |
| WO | WO 2009/133823 | 11/2009 |

* cited by examiner

PUNCTURE SEALANT LAMINATE

This application is a divisional of U.S. patent application Ser. No. 12/943,963 now U.S. Pat. No. 8,646,501, filed on Nov. 11, 2010. The teachings of U.S. patent application Ser. No. 12/943,963 are incorporated herein by reference in their entirety.

BACKGROUND OF THE INVENTION

It is well known that when a pneumatic tire is punctured, such as by a nail or other sharp object, it loses its air pressure and thus loses its ability to perform adequately. Such a punctured pneumatic tire is commonly referred to as a "flat tire."

To minimize the damage caused by such a puncture, it is known to provide puncture sealants, typically made of puncture sealing rubber or plastic material, onto the crown portion of a pneumatic tire. When a pneumatic tire with a puncture sealant is punctured, the puncture sealant forms a seal around the corresponding opening in the tire to minimize the loss of air pressure.

One problem with known puncture sealants, however, is that they are not recommended for higher speed tires because of the cold flow properties of the sealant material. The sealant material tends to migrate within the tire due to gravity during storage of the tire or when the vehicle that has the tire mounted to it is parked. This migration occurs because when the pneumatic tire with puncture sealant material is cured or vulcanized, the sealant material is depolymerized and thus can flow circumferentially or from side to side within the pocket created in the tire for the sealant material.

There is a need for a puncture sealant that effectively forms a seal during a puncture but does so in a way that minimizes known disadvantages.

SUMMARY OF THE INVENTION

This invention generally relates to methods and apparatuses concerning pneumatic tires and more specifically to methods and apparatuses concerning a puncture sealant laminate for pneumatic tires. According to one embodiment of this invention, a pneumatic tire may comprise: an outer surface; an inner surface positioned radially inward of the outer surface; and, a puncture sealant laminate positioned radially between the inner surface and the outer surface. The puncture sealant laminate may have first and second ends and may comprise: a first layer of sealant material that extends from the first end to the second end of the puncture sealant laminate; a first layer of non-sealant material that is positioned radially outward of the first layer of sealant material and that extends from the first end to the second end of the puncture sealant laminate; a second layer of sealant material that is positioned radially outward of the first layer of non-sealant material and that extends from the first end to the second end of the puncture sealant laminate; a second layer of non-sealant material that is positioned radially outward of the second layer of sealant material and that extends from the first end to the second end of the puncture sealant laminate; and, a third layer of sealant material that is positioned radially outward of the second layer of non-sealant material and that extends from the first end to the second end of the puncture sealant laminate. The first and second layers of non-sealant material may prevent the first, second, and third layers of sealant material from contacting each other. Each of the first and second layers of non-sealant material may have first and second ends that attach to rubber in the pneumatic tire that is not part of the puncture sealant laminate.

According to another embodiment of this invention, a puncture sealant laminate for prevention of a flat tire in case of a puncture of a pneumatic tire may comprise: first and second ends; a first layer of sealant material that extends from the first end to the second end of the puncture sealant laminate; a first layer of non-sealant material that is positioned radially outward of the first layer of sealant material and that extends from the first end to the second end of the puncture sealant laminate; a second layer of sealant material that is positioned radially outward of the first layer of non-sealant material and that extends from the first end to the second end of the puncture sealant laminate; a second layer of non-sealant material that is positioned radially outward of the second layer of sealant material and that extends from the first end to the second end of the puncture sealant laminate; and, a third layer of sealant material that is positioned radially outward of the second layer of non-sealant material and that extends from the first end to the second end of the puncture sealant laminate. The first and second layers of non-sealant material may prevent the first, second, and third layers of sealant material from contacting each other. The first and second layers of non-sealant material may have first and second ends that attach to rubber in the pneumatic tire that is not part of the puncture sealant laminate.

According to yet another embodiment of this invention, a method of making a pneumatic tire may comprise the steps of: (A) applying an inner liner onto a tire building drum; (B) applying a puncture sealant laminate onto the tire building drum, the puncture sealant laminate comprising: (1) first and second ends; (2) a first layer of sealant material that extends from the first end to the second end of the puncture sealant laminate; (3) a first layer of non-sealant material that is positioned radially outward of the first layer of sealant material and that extends from the first end to the second end of the puncture sealant laminate; (4) a second layer of sealant material that is positioned radially outward of the first layer of non-sealant material and that extends from the first end to the second end of the puncture sealant laminate; (5) a second layer of non-sealant material that is positioned radially outward of the second layer of sealant material and that extends from the first end to the second end of the puncture sealant laminate; and, (6) a third layer of sealant material that is positioned radially outward of the second layer of non-sealant material and that extends from the first end to the second end of the puncture sealant laminate; (C) applying a tread onto the tire building drum to form a green tire; and, (D) vulcanizing the green tire to form a cured pneumatic tire. Step (D) may comprise the step of: using the first and second layers of non-sealant material prevent the first, second, and third layers of sealant material from contacting each other.

One advantage of this invention is that migration of sealant material within a pneumatic tire is reduced.

Another advantage of this invention is that higher speed pneumatic tires can include puncture sealant materials.

Yet another advantage of this invention is that tire uniformity, especially for dynamic and static balance, can be improved.

Other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DEFINITIONS

"Apex" means a non-reinforced elastomer positioned radially above a bead core.

"Axial" and "axially" mean lines or directions that are parallel to the axis of rotation of the tire.

"Bead" means that part of the tire comprising an annular tensile member and shaped to fit the design rim.

"Carcass" means the tire structure apart from the belt structure, tread, undertread, and sidewall rubber, but including the beads and plies.

"Circumferential" means lines or directions extending along the perimeter of the surface of the annular tread perpendicular to the axial direction.

"Cord" means one of the reinforcement strands of which the plies in the tire are comprised.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Inner Liner" means the layer or layers of elastomer or other material that form the inside surface of a tubeless tire and that contain the inflating fluid within the tire.

"Ply" means a continuous layer of rubber-coated parallel cords.

"Radial" and "radially" mean directions radially toward (inward) or away from (outward) the axis of rotation of the tire.

"Radial tire" means a belted or circumferentially-restricted pneumatic tire in which the ply cords (which may or may not extend from bead to bead) are laid at cord angles between 65 degrees and 90 degrees with respect to the equatorial plane of the tire.

"Tread" means a molded rubber component which, when bonded to the rest of the tire, includes that portion of the tire that comes into contact with the road when the tire is normally inflated and under normal load, that is, the footprint.

DETAILED DESCRIPTION OF THE INVENTION

Figure 1:
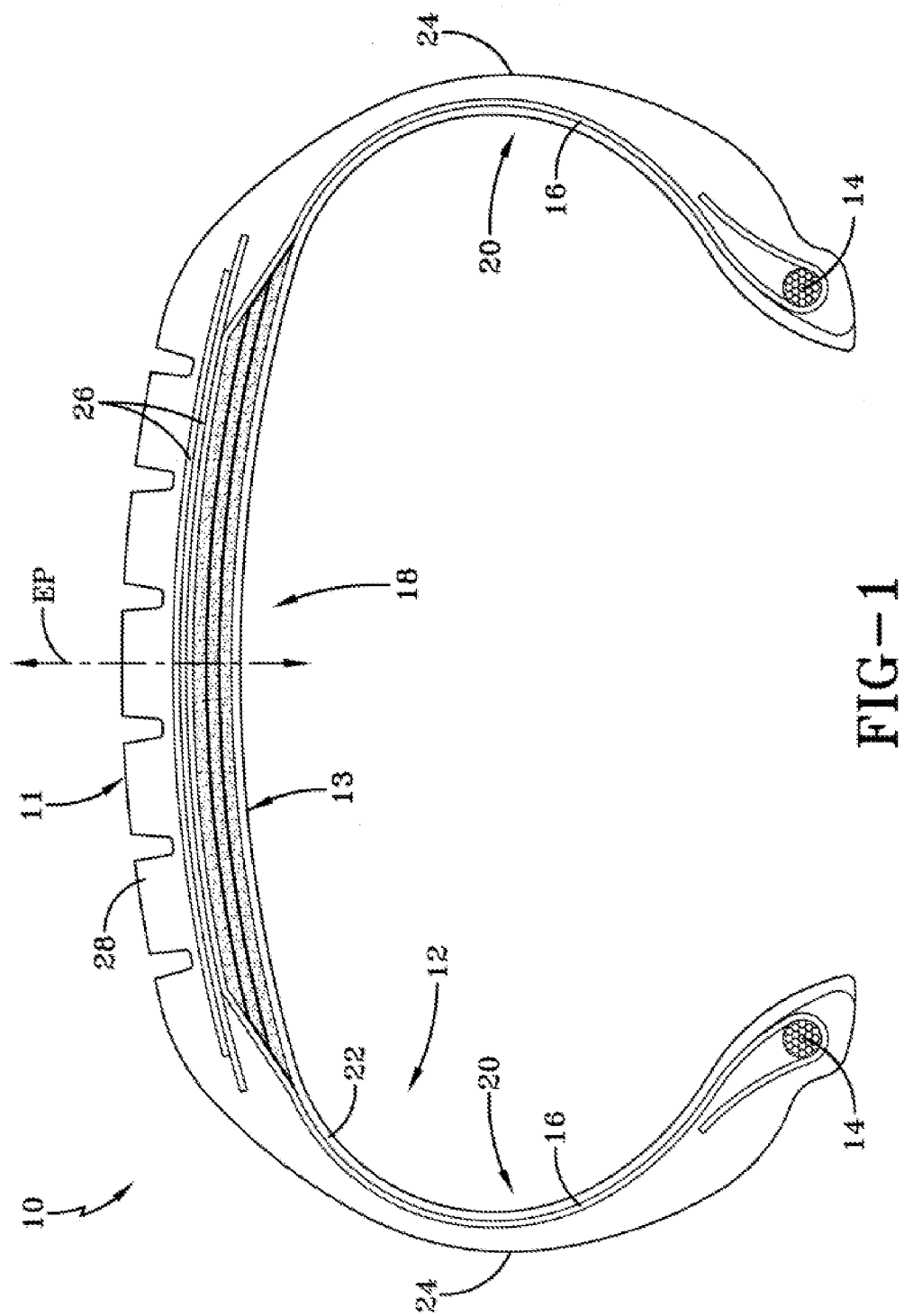
FIG. 1 is a cross-section of a first example tire constructed in accordance with this invention.

Referring now to the drawings wherein the showings are for purposes of illustrating embodiments of the invention only and not for purposes of limiting the same, and wherein like reference numerals are understood to refer to like components, FIG. 1 shows a cross-sectional view of a pneumatic tire 10 having a puncture sealant laminate 30 according to one embodiment of this invention. The pneumatic tire 10 may be of any type and size chosen with the sound judgment of a person of skill in the art including, for some non-limiting examples, a truck tire, a light truck tire or a passenger tire. The tire 10 may have a carcass 12 that may include a pair of annular beads 14, 14 and one or more plies 16 that may extend from around the beads 14, 14, as shown. The carcass 12 may define a crown region 18 and a pair of sidewalls 20, 20. Other conventional components may be positioned on the carcass 12 such as an inner liner 22, sidewall rubber portions 24, 24, a belt package 26 and a tread 28. Because a tire carcass and these other components are well known to those of skill in the art, further details will not be provided except as noted below.

Figure 2:
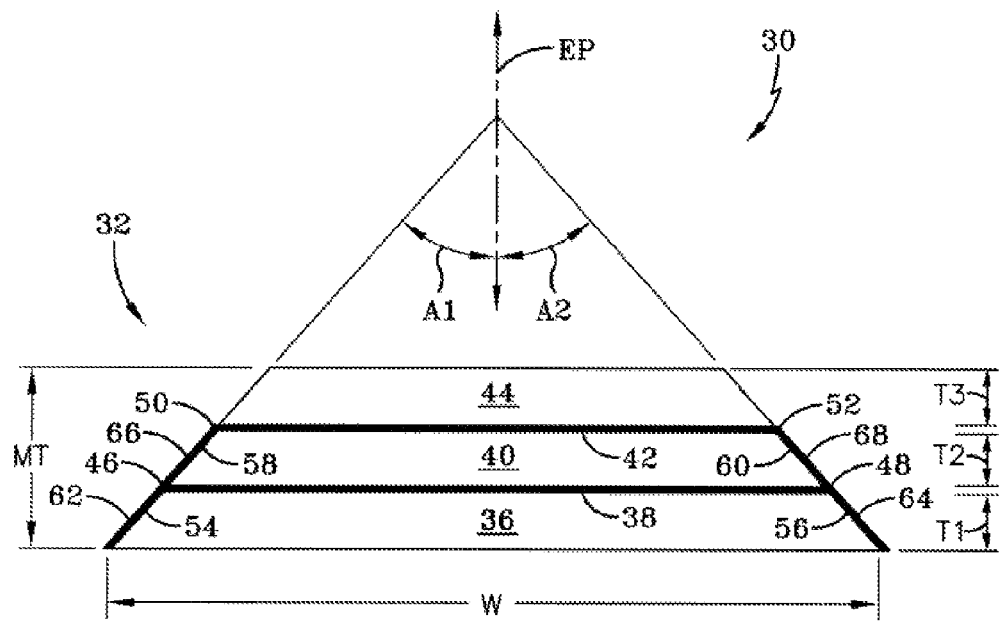
FIG. 2 is a cross-section of a puncture sealant laminate constructed in accordance with this invention.

With reference now to FIGS. 1-2, the puncture sealant laminate 30, which may have first and second ends 32, 34, is shown positioned in the crown region 18 radially outward of the inner liner 22 and radially inward of the plies 16. In should be noted, however, that the puncture sealant laminate 30 can be positioned anywhere within the tire 10, chosen with the sound judgment of a person of skill in the art, between an outer surface 11 and an inner surface 13 of the tire 10. The puncture sealant laminate 30 may include: a first layer of sealant material 36; a first layer of non-sealant material 38 that is positioned radially outward of the first layer of sealant material 36; a second layer of sealant material 40 that is positioned radially outward of the first layer of non-sealant material 38; a second layer of non-sealant material 42 that is positioned radially outward of the second layer of sealant material 40; and, a third layer of sealant material 44 that is positioned radially outward of the second layer of non-sealant material 42. Each of the layers 36, 38, 40, 42, 44 may extend from the first end 32 to the second end 34 of the puncture sealant laminate 30, as shown.

With continuing reference to FIGS. 1-2, the first and second layers of non-sealant material 38, 42 prevent the first, second, and third layers of sealant material 36, 40, 44 from contacting each other. Thus, the first and second layers of non-sealant material 38, 42 serve as boundaries for the first, second, and third layers of sealant material 36, 40, 44. With this design the sealant material(s), when depolymerized, remain in their proper circumferential position(s). In one embodiment, each of the first and second layers of non-sealant material 38, 42 have first ends 46, 50, respectively and second ends 48, 52, respectively that attach to rubber in the pneumatic tire that is not part of the puncture sealant laminate 30. With this design the puncture sealant laminate 30 is held in place within the tire 10.

With reference now to FIG. 2, each of the first and second layers of sealant material 36, 40 may have first axial edges 54, 58, respectively and second axial edges 56, 60, respectively. In one embodiment, shown, the first end 46 of the first layer of non-sealant material 38 forms a boundary 62 for the first axial edge 54 of the first layer of sealant material 36 and the second end 48 of the first layer of non-sealant material 38 forms a boundary 64 for the second axial edge 58 of the first layer of sealant material 36. Similarly, the first end 50 of the second layer of non-sealant material 42 may form a boundary 66 for the first axial edge 58 of the second layer of sealant material 40 and the second end 52 of the second layer of non-sealant material 42 may form a boundary 68 for the second axial edge 60 of the second layer of sealant material 42. This design protects the axial edges 54, 56, 58, 60 of the first and second layers of sealant material 36, 40. Though not shown, it is also contemplated to provide a third non-sealant layer positioned radially outward of the third layer of sealant material 44. If used, this third non-sealant layer may have ends that form boundaries for the axial edges of the third layer of sealant material 44. It is also contemplated, but not shown, to provide a fourth non-sealant layer positioned radially inward of the first layer of sealant material 36. With the addition of third and fourth non-sealant layers, the puncture sealant laminate 30 may have an outer boundary around its entire perimeter.

With continuing reference to FIG. 2, the puncture sealant laminate 30 may be shaped and sized in any manner chosen with the sound judgment of a person of skill in the art. In one embodiment, the puncture sealant laminate 30 has a maximum thickness MT of at least 3 millimeters. In another embodiment, the puncture sealant laminate 30 has a maximum thickness MT of at least 4 millimeters. In yet another embodiment, the puncture sealant laminate 30 has a maximum thickness MT of at least 5 millimeters. In still another embodiment, the puncture sealant laminate 30 has a maximum thickness MT of at least 6 millimeters. The first and second ends 32, 34 of the puncture sealant laminate 30 may be angled with respect to the equatorial plane (EP) of the tire at angles A1, A2 as shown. In one embodiment, the angles A1, A2 are between 5 degrees and 70 degrees. In another embodiment, the angles A1, A2 are between 15 degrees and 60 degrees. In yet another embodiment, the angles A1, A2 are between 25 degrees and 50 degrees. It is also contemplated to make the angles A1, A2 non-similar. Angle A1 may be, for example, at 25 degrees while the angle A2 may be at 45 degrees. The width W, the maximum thickness MT, and the angles A1, A2 of the puncture sealant laminate 30 can be varied by the tire designer to achieve desired tire performance characteristics.

Still referring to FIG. 2, the non-sealant layers 38, 42 may be shaped and sized in any manner chosen with the sound judgment of a person of skill in the art and may also be formed of any material chosen with the sound judgment of a person of skill in the art. Each non-sealant layer 38, 42 should have a width and thickness sufficient to properly protect and seal the sealant layers 36, 40, 44 from each other. Some non-limiting examples of materials that may be used include vulcanizable rubber, woven fabric, dipped fabric, wire and combinations of such materials.

With continuing reference to FIG. 2, the sealant layers 36, 40, 42 may be shaped and sized in any manner chosen with the sound judgment of a person of skill in the art and may also be formed of any material chosen with the sound judgment of a person of skill in the art. In one embodiment, shown, the thickness T1, T2, T3 of each of the sealant layers 36, 40, 42 are uniform along the entire widths of the sealant layers 36, 40, 42. It is also contemplated to use varied thicknesses along the width of the sealant layers 36, 40, 42. While the thicknesses T1, T2, T3 are shown to be the same, it is also contemplated to vary them. Thus, for one non-limiting example, the thickness T3 may be less than the thickness T1. Some non-limiting examples of materials that may be used to form the sealant layers 36, 40, 42 are included in U.S. Pat. Nos. 4,895,610, 6,837,287 and, 7,073, 550 the entirety of each of which is incorporated herein by reference.

Figure 3:
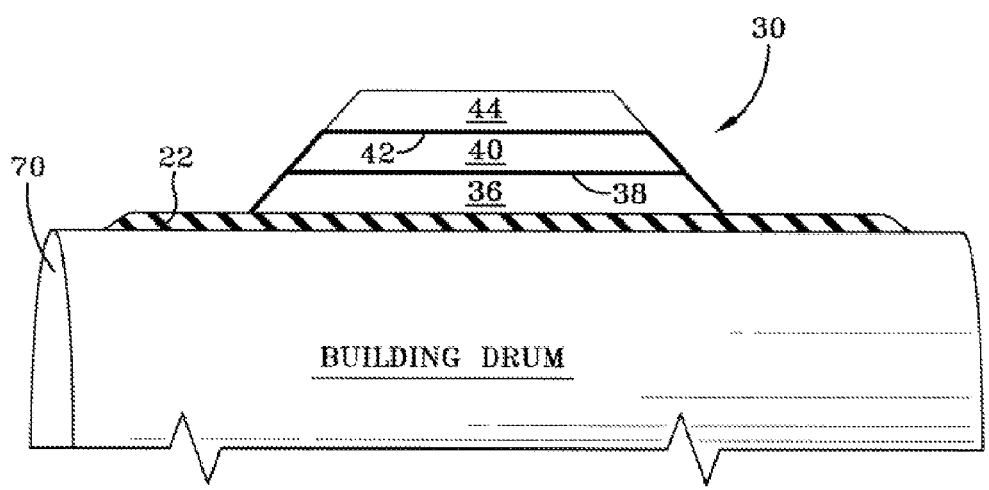
FIG. 3 is schematic view of a cross-section of a puncture sealant laminate and an inner liner shown on a tire building drum.

With reference now to FIGS. 2-3, embodiments of method steps that may be used to construct a pneumatic tire using a puncture sealant laminate 30 will now be described. First the inner liner 22 may be applied onto a tire building drum 70. The puncture sealant laminate 30 may then be applied to the tire building drum 70. In one embodiment, the puncture sealant laminate 30 is preassembled in a separate process. The preassembled puncture sealant laminate 30 is then positioned near the tire building drum 70 and applied to the tire building drum 70 in turn. In another embodiment, the puncture sealant laminate 30 is applied, layer by layer, onto the tire building drum 70. Specifically, the first layer of sealant material 36 may be applied onto the inner liner 22. The first layer of non-sealant material 38 may then be applied onto the first layer of sealant material 36. The second layer of sealant material 40 may then be applied onto the first layer of non-sealant material 38. The second layer of non-sealant material 42 may then be applied onto the second layer of sealant material 40. Finally, the third layer of sealant material 44 may be applied onto the second layer of non-sealant material 42.

With continuing reference to FIGS. 2-3, in one embodiment of assembling the puncture sealant laminate 30, whether preassembled in a separate process or applied layer by layer onto the tire building drum 70, when applying the first layer of non-sealant material 38 onto the first layer of sealant material 36 the first end 46 of the first layer of non-sealant material 38 may be extended over the first axial edge 54 of the first layer of sealant material 36 to form a boundary for the first axial edge 54 of the first layer of sealant material 36. Similarly, the second end 48 of the first layer of non-sealant material 38 may be extended over the second axial edge 56 of the first layer of sealant material 36 to form a boundary for the second axial edge of 56 the first layer of sealant material 36. In a similar manner, if desired, the first end 50 of the second layer of non-sealant material 42 may be extended over the first axial edge 58 of the second layer of sealant material 40 to form a boundary for the first axial edge 58 of the second layer of sealant material 40 and the second end 52 of the second layer of non-sealant material 42 may be extended over the second axial edge 60 of the second layer of sealant material 40 to form a boundary for the second axial edge 60 of the second layer of sealant material 40.

Still referring to FIGS. 2-3, in one embodiment of assembling the puncture sealant laminate 30, whether preassembled in a separate process or applied layer by layer onto the tire building drum 70, when applying the second layer of non-sealant material 42 onto the second layer of sealant material 40 the first end 50 of the second layer of non-sealant material 42 may be contacted to the first end 46 of the first layer of non-sealant material 38 and the second end 52 of the second layer of non-sealant material 42 may be contacted to the second end 48 of the first layer of non-sealant material 38. With this design the first and second layers of non-sealant material 38, 42 completely enclose the second layer of sealant material 40.

With reference now to FIGS. 1-3, once the puncture sealant laminate 30 is applied to the tire building drum 70, other tire components can be applied as required. The belt package 26 and the tread 28, for example, can be applied. Once the green (uncured) tire has been assembled, it can be vulcanized to form a cured pneumatic tire as is known to those of skill in the art. Tires made according to this invention can be vulcanized over a wide temperature range depending somewhat upon the size of the tire and the degree of desired depolymerization of the layers of sealant material as well as the thickness of the layers of sealant material. During the vulcanization process, the ends of the first and second non-sealant layers 38, 42 may attach to the rest of the rubber in the tire 10 to prevent the puncture sealant laminate 30 from moving circumferentially when the sealant layers depolymerize. The first and second layers of non-sealant material 38, 42 also prevent the first, second, and third layers of sealant material 36, 40, 44 from contacting each other both while the tire 10 is green and also when it is cured.

With continuing reference to FIGS. 1-3, while the puncture sealant laminate 30 has been shown and described as being applied to the inner liner 22, it should be understood, as noted above, that the puncture sealant laminate 30 can be positioned anywhere within the tire 10, chosen with the sound judgment of a person of skill in the art, between the outer surface 11 and the inner surface 13 of the tire 10. In one embodiment, for example, the puncture sealant laminate 30 may be positioned radially outward of one or more plies 16.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A method of making a pneumatic tire comprising the steps of:
   (A) applying an inner liner onto a tire building drum;
   (B) applying a puncture sealant laminate onto the tire building drum, the puncture sealant laminate comprising: (1) first and second ends; (2) a first layer of sealant material that extends from the first end to the second end of the puncture sealant laminate; (3) a first layer of non-sealant material that is positioned radially outward of the first layer of sealant material and that extends from the first end to the second end of the puncture sealant laminate; (4) a second layer of sealant material that is positioned radially outward of the first layer of non-sealant material and that extends from the first end to the second end of the puncture sealant laminate; (5) a second layer of non-sealant material that is positioned radially outward of the second layer of sealant material and that extends from the first end to the second end of the puncture sealant laminate; and, (6) a third layer of sealant material that is positioned radially outward of the second layer of non-sealant material and that extends from the first end to the second end of the puncture sealant laminate; wherein the first and second layers of non-sealant material comprise one of fabric and wire;
   (C) applying a tread onto the tire building drum to form a green tire; and
   (D) vulcanizing the green tire to form a cured pneumatic tire wherein the first and second layers of non-sealant material prevent the first, second, and third layers of sealant material from contacting each other.

2. The method of claim 1 wherein step (B) comprises the steps of:
   preassembling the puncture sealant laminate in a separate process; and
   positioning the preassembled puncture sealant laminate near the tire building drum.

3. The method of claim 1 wherein step (B) comprises the steps of:
   applying the first layer of sealant material onto the inner liner;
   applying the first layer of non-sealant material onto the first layer of sealant material;
   applying the second layer of sealant material onto the first layer of non-sealant material;
   applying the second layer of non-sealant material onto the second layer of sealant material; and
   applying the third layer of sealant material onto the second layer of non-sealant material.

4. The method of claim 3 wherein step (B) comprises the steps of:
   providing the first layer of sealant material with first and second axial edges;
   extending the first end of the first layer of non-sealant material over the first axial edge of the first layer of sealant material to form a boundary for the first axial edge of the first layer of sealant material; and
   extending the second end of the first layer of non-sealant material over the second axial edge of the first layer of sealant material to form a boundary for the second axial edge of the first layer of sealant material.

5. The method of claim 4 wherein step (B) comprises the steps of:
   providing the second layer of sealant material with first and second axial edges;
   extending the first end of the second layer of non-sealant material over the first axial edge of the second layer of sealant material to form a boundary for the first axial edge of the second layer of sealant material; and
   extending the second end of the second layer of non-sealant material over the second axial edge of the second layer of sealant material to form a boundary for the second axial edge of the second layer of sealant material.

6. The method of claim 5 wherein the step of applying the second layer of non-sealant material onto the second layer of sealant material, comprises the steps of:
   contacting the first end of the second layer of non-sealant material to the first end of the first layer of non-sealant material; and
   contacting the second end of the second layer of non-sealant material to the second end of the first layer of non-sealant material.

7. The method of claim 1 wherein the first, second, and third layers of sealant material consist essentially of the same material.

8. The method of claim 1 wherein each of the first and second layers of non-sealant material have first and second ends that attach to rubber in the pneumatic tire that is not part of the puncture sealant laminate.

9. The method of claim 1 wherein the first layer of sealant material has a substantially uniform thickness along its entire width.

10. The method of claim 9 wherein the second layer of sealant material has a substantially uniform thickness along its entire width.

11. The method of claim 1 wherein the first and second ends of the puncture sealant laminate are angled with respect to the equatorial plane of the pneumatic tire at angles A1, A2 that are between 5° and 70°.

12. The method of claim 1 wherein the puncture sealant laminate has a maximum thickness of at least 5 millimeters.

13. The method of claim 1 wherein the puncture sealant laminate has a maximum thickness of at least 4 millimeters.

14. The method of claim 1 wherein the first and second ends of the puncture sealant laminate are angled with respect to the equatorial plane of the pneumatic tire at angles A1, A2 that are between 15° and 60°.

15. The method of claim 1 wherein the puncture sealant laminate has a maximum thickness of at least 6 millimeters.

16. The method of claim 1 wherein the first and second ends of the puncture sealant laminate are angled with respect to the equatorial plane of the pneumatic tire at angles A1, A2 that are between 25° and 50°.

17. The method of claim 1 wherein the sealant layers are comprised of butyl rubber having a number average molecular weight of 200,000 to 500,000, and a Mooney viscosity ranging from about 40 to 58, about 10 to 40 parts by weight of carbon black, about 5 to 35 parts by weight of polyisobutylene having a number average molecular weight of about 7,500 to 15,000, about 5 to 35 parts by weight of an oil extender, about 0 parts to 1 parts by weight sulfur, and about 1 to 8 parts by weight of a peroxide vulcanizing agent per 100 parts of the butyl rubber.

18. A pneumatic tire comprising:
   an outer surface;
   an inner surface positioned radially inward of the outer surface;
   one or more plies; and
   a puncture sealant laminate positioned radially between the inner surface and the outer surface, wherein the puncture sealant is positioned radially outward from one or more of the plies, wherein the puncture sealant laminate has a first end and a second end; and wherein the puncture sealant laminate is comprised of:
   a first layer of sealant material that extends from the first end to the second end of the puncture sealant laminate;
   a first layer of non-sealant material that is positioned radially outward of the first layer of sealant material and that extends from the first end to the second end of the puncture sealant laminate;
   a second layer of sealant material that is positioned radially outward of the first layer of non-sealant material and that extends from the first end to the second end of the puncture sealant laminate;
   a second layer of non-sealant material that is positioned radially outward of the second layer of sealant material and that extends from the first end to the second end of the puncture sealant laminate;
   a third layer of sealant material that is positioned radially outward of the second layer of non-sealant material and that extends from the first end to the second end of the puncture sealant laminate;
   wherein the first and second layers of non-sealant material prevent the first, second, and third layers of sealant material from contacting each other;
   wherein the first and second layers of non-sealant material comprise one of fabric and wire; and
   wherein each of the first and second layers of non-sealant material have first and second ends that attach to rubber in the pneumatic tire that is not part of the puncture sealant laminate.

* * * * *